US006959153B2

(12) United States Patent
Vohra

(10) Patent No.: US 6,959,153 B2
(45) Date of Patent: Oct. 25, 2005

(54) DYNAMICALLY RECONFIGURABLE ADD/DROP MULTIPLEXER WITH LOW COHERENT CROSS-TALK FOR OPTICAL COMMUNICATION NETWORKS

(75) Inventor: Sandeep T. Vohra, Ellicott City, MD (US)

(73) Assignee: Broadband Royalty Corporation, Wilmington, DE (US)

( * ) Notice: Subject to any disclaimer, the term of this patent is extended or adjusted under 35 U.S.C. 154(b) by 609 days.

(21) Appl. No.: 10/022,516

(22) Filed: Dec. 20, 2001

(65) Prior Publication Data

US 2002/0176134 A1 Nov. 28, 2002

Related U.S. Application Data

(60) Provisional application No. 60/292,913, filed on May 24, 2001.

(51) Int. Cl.[7] .................................. H04J 14/02
(52) U.S. Cl. .................... 398/83; 398/85; 398/87; 398/43; 398/24
(58) Field of Search ..................... 398/83, 85, 87, 398/43, 24

(56) References Cited

U.S. PATENT DOCUMENTS

| | | | |
|---|---|---|---|
| 4,589,285 A | 5/1986 | Savit | |
| 5,022,730 A | 6/1991 | Cimimi et al. | |
| 5,208,819 A | 5/1993 | Huber | |
| 5,380,995 A | 1/1995 | Udd et al. | |
| 5,392,117 A | 2/1995 | Belleville et al. | |
| 5,394,415 A | 2/1995 | Zucker et al. | |
| 5,397,891 A | 3/1995 | Udd et al. | |
| 5,401,956 A | 3/1995 | Dunphy et al. | |
| 5,430,574 A | 7/1995 | Tehrani | |
| 5,579,143 A * | 11/1996 | Huber | 398/72 |
| 5,591,965 A | 1/1997 | Udd | |
| 5,612,805 A | 3/1997 | Fevrier et al. | |
| 5,673,129 A | 9/1997 | Mizrahi | |
| 5,680,489 A | 10/1997 | Kersey | |
| 5,691,989 A | 11/1997 | Rakuljic et al. | |
| 5,706,301 A | 1/1998 | Lagerström | |
| 5,712,717 A | 1/1998 | Hamel et al. | |
| 5,748,349 A | 5/1998 | Mizrahi | |
| 5,754,321 A | 5/1998 | Giles et al. | |
| 5,771,112 A | 6/1998 | Hamel et al. | |
| 5,778,118 A | 7/1998 | Sridhar | |

(Continued)

OTHER PUBLICATIONS

Derickson, Dennis, "Fiber Optic Test and Measurement", Hewlett Packard Co., 1998, pp. 95-109.

*Primary Examiner*—Jason Chan
*Assistant Examiner*—Quan-Zhen Wang
(74) *Attorney, Agent, or Firm*—Oblon, Spivak, McClelland, Maier & Neustadt, P.C.

(57) ABSTRACT

An add-drop multiplexer is described, in one embodiment the add-drop multiplexer includes an optical transmission signal input port adapted to receive a wavelength division multiplexed optical transmission signal, an optical transmission signal output port adapted to output at least a portion of the wavelength division multiplexed optical transmission signal, an add-drop optical channel port adapted to receive an optical add channel and output an optical drop channel, and a wavelength selective optical filter arranged between the optical transmission signal input port, the optical transmission signal output port and the optical add-drop channel port. The wavelength selective optical filter reflects optical channels that will continue through the add-drop multiplexer along a transmission line to the optical transmission signal output port and permits an optical channel that is to be dropped to pass therethrough.

35 Claims, 6 Drawing Sheets

U.S. PATENT DOCUMENTS

| | | | | |
|---|---|---|---|---|
| 5,780,843 | A | 7/1998 | Cliché et al. | |
| 5,818,585 | A | 10/1998 | Davis et al. | |
| 5,825,792 | A | 10/1998 | Villeneuve et al. | |
| 5,838,437 | A | 11/1998 | Miller et al. | |
| 5,889,901 | A | 3/1999 | Anderson et al. | |
| 5,892,582 | A | 4/1999 | Bao et al. | |
| 5,915,051 | A | 6/1999 | Damask et al. | |
| 5,915,052 | A | 6/1999 | Ball | |
| 5,953,141 | A | 9/1999 | Liu et al. | |
| 5,956,355 | A | 9/1999 | Swanson et al. | |
| 5,963,567 | A | 10/1999 | Veselka et al. | |
| 5,982,962 | A | 11/1999 | Koops et al. | |
| 5,987,197 | A | 11/1999 | Kersey | |
| 5,991,476 | A | 11/1999 | Baney et al. | |
| 5,995,255 | A | 11/1999 | Giles | |
| 6,008,920 | A | 12/1999 | Hendrix | |
| 6,035,080 | A | 3/2000 | Henry et al. | |
| 6,044,189 | A | 3/2000 | Miller | |
| 6,069,719 | A | 5/2000 | Mizrahi | |
| 6,072,567 | A | 6/2000 | Sapack | |
| 6,097,487 | A | 8/2000 | Kringlebotn et al. | |
| 6,111,681 | A | 8/2000 | Mizrahi et al. | |
| 6,115,122 | A | 9/2000 | Bao et al. | |
| 6,118,530 | A | 9/2000 | Bouevitch et al. | |
| 6,128,427 | A | 10/2000 | Espindola et al. | |
| 6,134,003 | A | 10/2000 | Tearney et al. | |
| 6,144,784 | A * | 11/2000 | Shigehara et al. | 385/24 |
| 6,154,590 | A | 11/2000 | Jin et al. | |
| 6,185,023 | B1 | 2/2001 | Mizrahi | |
| 6,188,499 | B1 | 2/2001 | Majima | |
| 6,201,909 | B1 | 3/2001 | Kewitsch et al. | |
| 6,208,443 | B1 | 3/2001 | Liu et al. | |
| 6,249,365 | B1 | 6/2001 | Mizrahi et al. | |
| 6,411,417 | B1 * | 6/2002 | Roberts et al. | 398/177 |
| 6,538,783 | B1 * | 3/2003 | Stephens | 398/82 |
| 6,704,509 | B1 * | 3/2004 | Yang et al. | 398/34 |
| 6,778,780 | B1 * | 8/2004 | Cao et al. | 398/84 |
| 2001/0030786 | A1 * | 10/2001 | Takahashi et al. | 359/127 |
| 2002/0131689 | A1 * | 9/2002 | Feuer et al. | 385/24 |

* cited by examiner

DYNAMICALLY RECONFIGURABLE ADD/DROP MULTIPLEXER WITH LOW COHERENT CROSS-TALK FOR OPTICAL COMMUNICATION NETWORKS

This application claims benefit of prior U.S. Application 60/292,913, filed May 24, 2001, the contents of which are incorporated into this application by reference.

BACKGROUND

1. Field of Invention

The invention relates to a device for wavelength division multiplexed systems and systems incorporating the device, and more particularly to dynamically reconfigurable add/drop multiplexers with low coherent cross-talk and optical communication networks incorporating add/drop multiplexers.

2. Discussion of Related Art

Demand for optical communication systems is growing with the growing demand for faster broadband and more reliable networks. Wavelength division multiplexing (WDM) is one technique used to increase the capacity of optical communication systems. Such optical communication systems include, but are not limited to, telecommunication systems, cable television systems (CATV), and local area networks (LANs). An introduction to the field of Optical Communications can be found in "Optical Communication Systems" by Gowar, ed. Prentice Hall, NY, 1993.

WDM optical communication systems carry multiple optical signal channels, each channel being assigned a different wavelength. Optical signal channels are generated, multiplexed to form an optical signal comprised of the individual optical signal channels, and transmitted over a single waveguide such as an optical fiber. The optical signal is subsequently demultiplexed such that each channel corresponding to a band of wavelengths is individually routed to a designated receiver.

Single or multiple optical channels can be routed to different destinations, such as in telecommunication networks, cable television subscriber systems and optical LANs. Routing is performed by selectively sending specific channels to a desired location. Another signal may be subsequently added to the dropped or other unused channel. This form of optical routing is generally referred to as "add/drop multiplexing or ADM".

Fixed wavelength add/drop multiplexers (WADM) are already available commercially. However, such systems require that the wavelengths to be dropped at a specific site, commonly known as a node, be known in advance. Fixed notch filters—typically made from Bragg gratings—are utilized to make fixed wavelength add/drop multiplexers. However, advanced optical networks require that a node be established within the network for any one, all, or any specific set of wavelengths to be dropped, or re-routed on demand. There is thus a strong need for programmable and/or reconfigurable all-optical wavelength add/drop multiplexers (WADM) in such networks.

In order to obtain reconfigurable add/drop multiplexers, optical components capable of directing or routing optical wavelengths are required. Bragg gratings, electromechanical switches, micro-electromechanical systems (MEMS), and liquid crystals are some of the optical components which have been proposed as tuning elements in a reconfigurable add/drop networking element.

Optical add/drop multiplexers based on tunable Fiber Bragg Gratings (FBGs) have been proposed and patented.

For instance, in U.S. Pat. No. 6,185,023, Mizrahi describes add/drop multiplexers which are compatible with dense wavelength division multiplexing (DWDM) systems. Mizrahi attempts to solve the problem of cross-talk between dropped and added channels by separating sets of Bragg gratings with an optical isolator. The Bragg grating sets and the optical isolator are interposed between first and second couplers. The optical channels to be dropped from the DWDM optical signal are reflected by the first set of Bragg gratings and exit the add/drop multiplexer through the first coupler. Similarly, in U.S. Pat. No. 6,069,719 and U.S. Pat. No. 5,748,349 of Mizrahi is disclosed a grating-based add/drop multiplexer wherein a set of Bragg gratings is positioned in the transmission path for reflected signals to be dropped.

Sridhar in U.S. Pat. No. 5,778,118 describes an optical add-drop multiplexer for wavelength division multiplexed optical communication systems. The add-drop multiplexer includes an optical filter for selecting portions of a wavelength division multiplexed optical signal. The portions of the wavelength division multiplexed signal which are not sent to an input port exit the add-drop multiplexer.

Giles et al in U.S. Pat. No. 5,754,321 describe an alternative add/drop optical circuit based on fiber Bragg gratings and polarizing beamsplitters. According to that reference, the input beamsplitter means splits the input signal into two different polarized input signals. Each polarized input signal is connected to a first end of a different selective wavelength filter, each of which is arranged to reflect the drop signal back to the input beamsplitter and pass the remaining signal portion to the output beamsplitter.

Liu et al in U.S. Pat. No. 5,953,141 describe an optical add-drop multiplexer and network which can dynamically route on a per-wavelength basis with minimized spectral filtering of the pass-through wavelengths which allows a wavelength to pass through a large number of routing nodes without distortion of the information. Similarly, in U.S. Pat. No. 6,208,443 B1 Liu et al discuss a method and apparatus for constructing an optical wavelength-routing network in which each network node is a dynamic optical add-drop multiplexer (OADM) with minimized spectral filtering effect on pass-through channels and with survivability upon failure.

Huber in U.S. Pat. No. 5,467,212 describes an addressable grating modulation system for an optical cable television system. A tunable optical filter is provided in order to switch video signals onto an optical fiber going to the node in a particular neighborhood. An arrangement uses in-fiber Bragg gratings in order to remove and insert different optical frequencies. The Bragg grating reflects one or more wavelengths and allows passage of wavelengths other than the desired wavelength. Therefore, the desired wavelength is dropped for processing further with other systems.

In the prior art the add/drop multiplexers are mostly based on fiber Bragg gratings. However, an issue of some significance with fiber-grating based tunable add-drop multiplexers is that of coherent cross talk. If a grating with insufficient reflectivity is used in an add/drop multiplexer, an unacceptable portion of the incident channel to be dropped will pass through, resulting in coherent cross-talk with the channel of the same wavelength which is subsequently added within the add-drop multiplexer. To limit this type of cross-talk it is desirable for attenuation of a dropped optical channel to be greater than 30 dB (typically 35 to 40 dB is desirable). While such high reflectivity gratings have been fabricated, the yields for such high reflectivity devices is low, making them very expensive. In addition, very high grating reflectivity is also associated with broader grating bandwidth, which makes these devices unattractive for optical networks utilizing closely spaced optical channels (e.g. 50 GHz spaced DWDM systems).

SUMMARY

It is therefore an object of this invention to overcome these and other limitations without putting stringent requirements on the grating characteristics thus allowing an overall cost reduction as well as better performance of the network.

This invention pertains to a dynamically reconfigurable add-drop multiplexer, using a tunable in-fiber Bragg grating, which eliminates coherent cross-talk prevalent in add/drop multiplexers and also provides for built-in optical channel monitoring for high reliability operation. This approach relaxes stringent requirements for grating characteristics thus reducing the overall cost of the system. Additionally, the architecture allows for the use of built-in optical amplification and channel equalization units to provide a "transparent" all-optical, dynamically configurable add/drop multiplexer, which can be data rate and data format independent.

In one embodiment the add-drop multiplexer comprises an optical transmission signal input port adapted to receive a wavelength division multiplexed optical transmission signal, an optical transmission signal output port adapted to output at least a portion of the wavelength division multiplexed optical transmission signal, an add-drop optical channel port adapted to receive an optical add channel and output an optical drop channel, and a wavelength selective optical filter arranged between the optical transmission signal input port, the optical transmission signal output port and the optical add-drop channel port. The wavelength selective optical filter reflects optical channels that will continue through the add-drop multiplexer along a transmission line to the optical transmission signal output port and permits an optical channel that is to be dropped to pass therethrough.

In another embodiment, the add-drop multiplexer further comprises a wavelength tracker and stabilizer comprising an optical channel monitor adapted to provide absolute wavelength and intensity information of the light reflected by the wavelength selective optical filter.

In one embodiment, the add-drop multiplexer further comprises an optical coupler in optical communication with the optical transmission signal input port and the wavelength selective optical filter. The optical coupler can be for example an optical circulator having a first optical port in communication with the optical transmission signal input port, a second optical port in communication with the selective optical filter, a third optical port in communication with the add-drop optical channel port.

In one embodiment, the wavelength selective optical filter comprises an optical fiber having fiber Bragg gratings therein. The fiber Bragg grating having a reflecting band corresponding to an optical channel permitted to pass through the add-drop multiplexer. The wavelength selective optical filter may further comprise a tuning element disposed proximate to the fiber Bragg gratings. Examples of a tuning element include a mechanical strain element attached to the fiber Bragg grating and a thermal element.

BRIEF DESCRIPTION OF THE DRAWINGS

These and other objects and advantages of the invention will become more apparent and more readily appreciated from the following detailed description of the presently preferred exemplary embodiments of the invention, taken in conjunction with the accompanying drawings, of which.

DETAILED DESCRIPTION

In the following description, in order to facilitate a thorough understanding of the invention and for purposes of explanation and not limitation, specific details are set forth such as particular optical and electrical circuits, circuit components, techniques, etc. However, the invention may be practiced in other embodiments that depart from these specific details. The terms optical and light are used in a broad sense in this description to include both visible and non-visible regions of the electromagnetic spectrum. Currently, infrared light is used extensively in transmitting signals in optical communication systems. Infrared light is included within the broad meaning of the term light as used herein.

Figure 1:
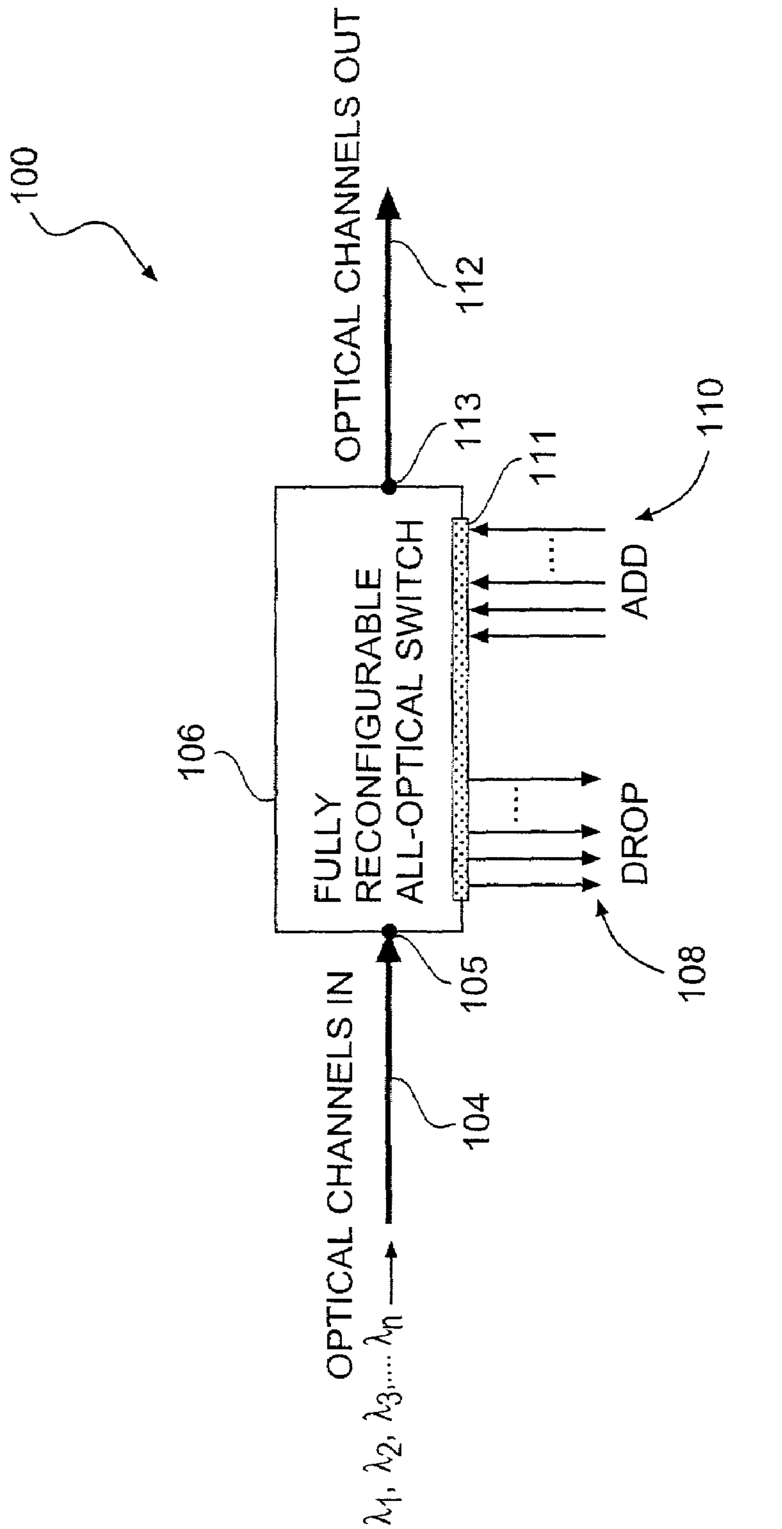
FIG. 1 is a block diagram representing general features of an add-drop multiplexer according to one embodiment of the present invention.

FIG. 1 shows a block diagram of add-drop multiplexer 100 according to the present invention. Multiple wavelength channels traveling along optical fiber 104 are sent into an add-drop unit 106, through optical transmission signal input port 105, at a node in the network (not showed in this figure). In the add-drop multiplexer 100, relevant wavelength channels 108 are dropped and new wavelength channels 110 are added at add-drop optical channel port 111. The output signal 112 represents the combined signal corresponding to a wavelength division multiplexed optical communication signal which includes the non-dropped, i.e., the through optical channels plus the optical channels 110 added. The output optical signal 112 exits the add-drop unit 106 at optical transmission signal output port 113.

Figure 2:
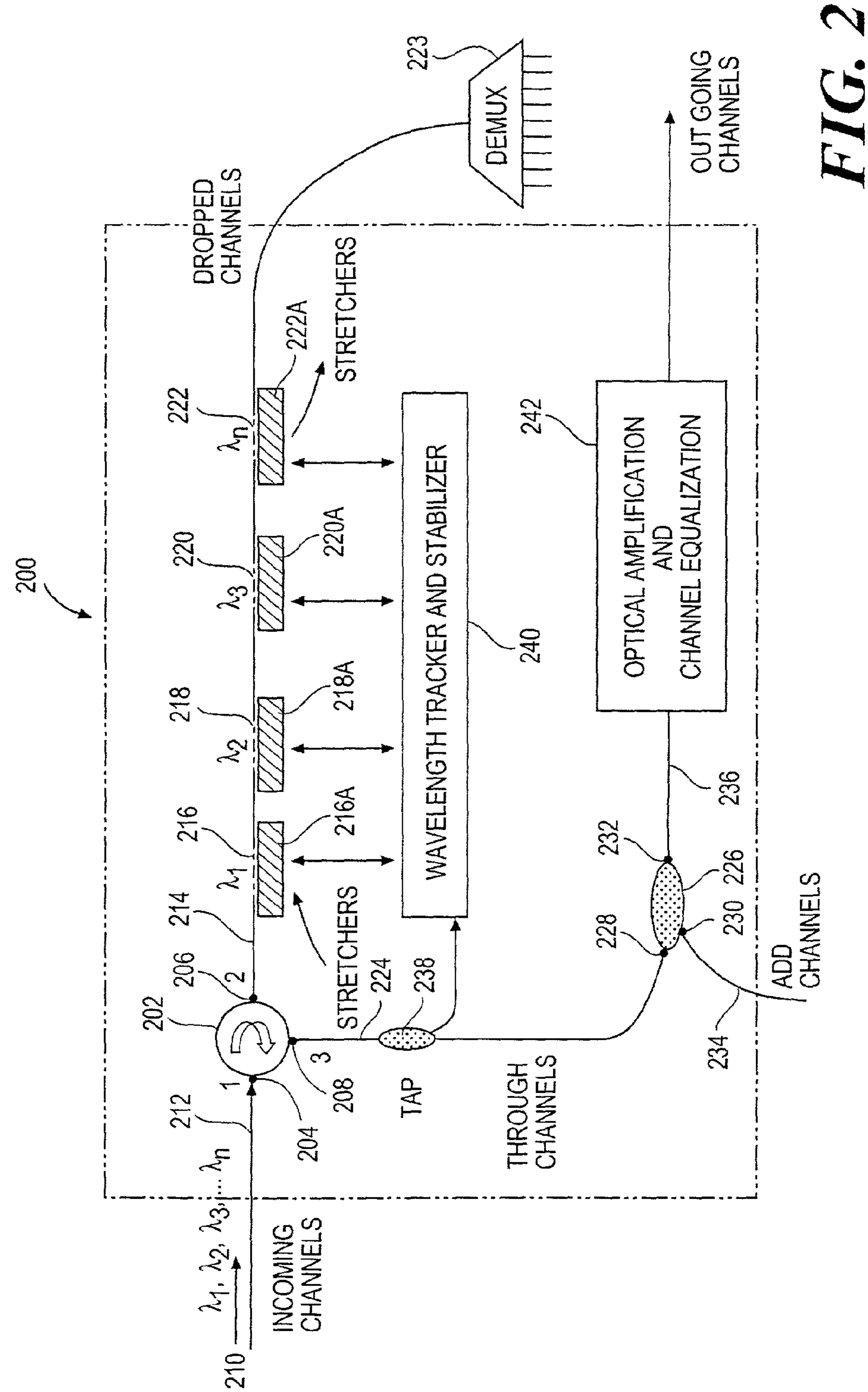
FIG. 2 is a schematic representation of an add-drop multiplexer according to one embodiment of the present invention.

FIG. 2 is a schematic representation of an add-drop multiplexer 200 according to one embodiment of the present invention. Add-drop multiplexer 200 comprises an optical coupler 202 for coupling signals to be processed and sent to an optical transmission system. Optical coupler 202 is selected from any device that is comprised of input-output ports that can receive a plurality of input-output signals. In one embodiment, optical coupler 202 is an optical circulator. Optical circulator 202, comprises first, second and third optical circulator ports 204, 206, and 208. For the sake of clarity, in the remaining of the description, optical coupler 202 will be referred to as optical circulator 202. It is, however, understood that other optical coupler devices may be used in place of an optical circulator. Optical circulator 202 is configured such that optical signal 210, comprised of a plurality of wavelengths, which enters circulator port 204 exits through circulator port 206, and the optical signal which enters circulator port 206 exits through circulator port 208.

First optical path 212 optically communicates with the first circulator port 204. First optical path 212 is configured to carry a wavelength division multiplexed optical communication signal 210 including one or a plurality of wavelengths.

Second optical path 214 optically communicates with the second circulator port 206 wherein optical filters 216, 218, 220 and 222 for selecting respectively wavelengths $\lambda_1$, $\lambda_2$, $\lambda_3$ and $\lambda_n$, are positioned in optical path 214. In one embodiment, optical filters 216, 218, 220 and 222 consist of in-fiber Bragg gratings. While four Bragg gratings are shown in FIG. 2, it is understood that that there can be one grating or a plurality of optical gratings. Each optical filter is configured to reflect a portion of optical wavelengths included in the wavelength division multiplexed optical communication signal to second circulator port 206 while transmitting the remaining wavelengths. The wavelengths being transmitted correspond to the optical channels to be dropped while the wavelengths reflected towards circulator port 206, to be output by circulator 202 through the third optical port 208, correspond to the through channels.

Third optical path 224, optically communicating with the third circulator port 208, is configured to receive optical wavelengths output by the third circulator port 208 corresponding to the channels not dropped from the wavelength division multiplexed optical communication signal 210. The channels in the third optical path 224, consisting of $\lambda_1$, $\lambda_2$, $\lambda_3$ and $\lambda_4$ correspond to the through channels.

A second optical coupler 226 has first and second coupler input ports (228, 230) and one coupler output port 232 configured such that optical signals which enter the first input port 228 and second input port 230 are combined and output to the coupler output port 232. The third optical path 224 communicating with the first input port 228 of the second coupler 226 transmits a wavelength division multiplexed optical communication signal from the third path 224 to the first input port 228 of the second coupler 226.

Fourth optical path 234 optically communicating with the second input port 230 of the second optical coupler 226 is configured to carry optical wavelengths to be added to channels of the third optical path 224.

Fifth optical path 236 optically communicating with the output port 232 of the second optical coupler 226 is configured for receiving the combined signals from the first input port 228 and second input port 230 of the second optical coupler 226. The combined signals correspond to a wavelength division multiplexed optical communication signal which include the through channels from the third optical path 224 and the optical channels added from the fourth optical path 234.

As mentioned previously, wavelengths $\lambda_1$, $\lambda_2$, $\lambda_3$ and $\lambda_n$, reflected off fiber gratings 216, 218, 220 and 222 enter circulator 202 at port 206 and exit circulator 202 at port 208. These wavelengths are considered the through channels. In other words, these wavelengths do not get dropped but are sent in the forward direction. This is an important distinction between the present invention and prior art utilizing tunable filters and circulators and/or optical couplers to design add-drop multiplexers. In prior art approaches, the optical add-drop multiplexer (OADM) is configured such that the through channels correspond to the grating being tuned away from the appropriate wavelength, thus letting the through channels pass and exit via port 206 of circulator 202, while the drop channels correspond to the grating being tuned to reflect the appropriate wavelength and exit through port 208 of circulator 202. In the present invention, the gratings are used in reverse arrangement such that the through channels correspond to the incoming wavelengths being reflected off the appropriate grating while the drop channel corresponds to the grating being shifted such that it lets the wavelength pass. This leads to the through channels exiting circulator port 208 and the drop channels exiting through port 206. The approach described in this invention has very useful implications making the tunable grating-based reconfigurable add-drop multiplexer described here cost effective and more practical for use in networks while providing low cross-talk effects.

Dropping channels, i.e. wavelength channels, occurs by tuning the filter element, such as an in-fiber Bragg grating, such that instead of reflecting the incoming wavelength and re-sending it back towards circulator 202, the grating reflection spectrum is 'pushed' out to let the channel continue on the output fiber of port 206. Multiple wavelengths are dropped by tuning each grating, such as 216, 218, 220, and 222, out of the appropriate reflection band. The dropped wavelengths can also be separated by using wavelength demultiplexer 223, if desired.

Another feature of the present invention is the wavelength tracker and stabilizer 240, which allows for precise wavelength monitoring and feedback to the tuning elements 216A, 218A, 220A and 222A which may comprise strain varying elements or assemblies such as piezo-electric elements. However, tuning elements 216A, 218A, 220A and 222A could also use thermal effects instead, such as temperature varying assemblies. Indeed, one should keep the tuning elements well within the guard band of the channels. The wavelength tracker and stabilizer 240 controls the reflection wavelength of the gratings by providing appropriate feedback to the tuning elements. The monitoring of the wavelengths is accomplished by tapping into the through signal in path 224 via tap 238. A portion of the signal, e.g., 1% to 5%, is adequate to provide input for the wavelength tracker and stabilizer 240. The wavelength tracker and stabilizer should have an accurate wavelength reference to provide very accurate wavelength tuning of the grating. The wavelength tracker and stabilizer 240 comprises an optical channel monitor which is described in a co-pending application entitled "Optical Channel Monitor with Continuous Gas Cell Calibration" U.S. application Ser. No. 09/808,222, the entire contents of which are incorporated herein by reference and in another co-pending application entitled "Optical Channel Monitor Ultilizing Multiple Fabry-Perot Filter Pass-Bands", U.S. application Ser. No. 09/929,339, the entire contents of which are also incorporated herein by reference.

Figure 3:
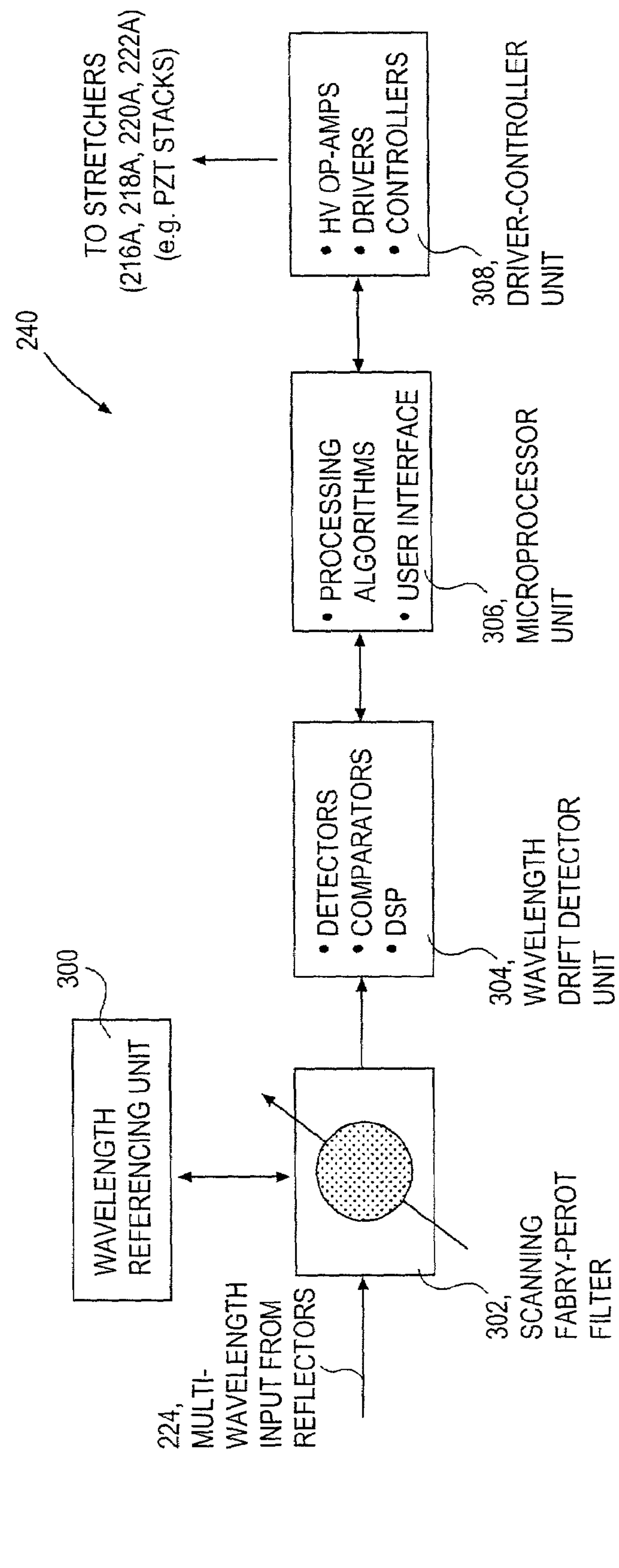
FIG. 3 is a block diagram representing an optical channel monitor used in one embodiment according to the invention.

FIG. 3 shows a block diagram of wavelength tracker and stabilizer 240 used in the optical add/drop multiplexer according to an embodiment of the present invention. Wavelength tracker and stabilizer 240 comprises wavelength referencing unit 300, scanning Fabry-Perot filter 302, wavelength drift detector unit 304, microprocessor unit 306 and driver-controller unit 308. A portion of the through signal in path 224 is sent into scanning Fabry-Perot filter 302. A wavelength referencing unit 300 is provided to allow comparison of the wavelength channels present in the through signal with a known wavelength reference. Wavelength referencing unit 300 is comprised of a broadband light source and a gas cell containing a gas having known absorption bands, in one embodiment. In another embodiment, the gas cell can be replaced by a series of fiber Bragg-gratings each having a different reflectivity characteristic. One could also use other references, such as an athermal Bragg grating, a reference source, and the like. The optical output of the Fabry-Perot filter 302 is detected by wavelength-drift detector unit 304 comprised of optical detectors, electronic signal comparators and digital signal processing units. Therefore, the optical signal is transformed into a digital electronic signal which can be sent to microprocessor unit 306 comprising electronic components and processing algorithms for managing the signal. The user interacts and inputs commands to microprocessor unit 306 through a user interface. In this way, microprocessor unit 306 controls the operation of Fabry-Perot filter 302. The electronic signal processed by microprocessor unit 306 is sent to driver-controller unit 308 for controlling tuning elements 216A, 218A, 220A, and 222A shown in FIG. 2. In this way, the use of wavelength tracker and stabilizer 240 provides feedback to the Bragg gratings 216, 218, 220 and 222 for maintaining the wavelengths within the wavelength band required for reflecting the desired wavelengths.

In FIG. 2, channels are added via port 230 of optical coupler 226. The added wavelengths can be introduced using a tunable laser source or individual lasers, not shown on FIG. 2, operating at an appropriate wavelength and modulated with signal information. The channels can be added, i.e. multiplexed, using a commercially available multiplexer or a set of couplers.

The output from port 232 of optical coupler 226 contains added channels as well as the through channels input to optical coupler 226 via port 228. The reconfigurable optical add-drop multiplexer (re-OADM) can be made "loss-less" by providing small amounts of built-in optical amplification 242 with the use of pure optical amplifiers such as erbium-doped fiber amplifiers or Raman amplifiers, or optical to electrical amplifiers such as semiconductor optical amplifiers (SOA). Since the architecture is essentially a low-loss architecture, the amount of amplification required is minimal. Therefore, the cost involved in building such systems remains low. Subsequent channel equalization can provide high quality output signals thus making the re-OADM "transparent". By tuning the gratings such that the drop channels correspond to signals passing through the gratings, the problem of coherent cross-talk between the drop and add channels, due to insufficient extinction ratio of gratings, is eliminated. In addition, by providing continuous wavelength monitoring of the entire wavelength range using an accurately referenced wavelength monitor and providing appropriate feedback to the tuning elements, the gratings are reliably held at their appropriate wavelengths to perform a given operation such as add, drop or pass through. Built-in optical amplification and channel equalization provides for a transparent and flexible add/drop multiplexer. The flexibility provided by the architecture in the present invention allows dropping one, multiple or all of the incoming wavelengths to be redirected quickly and accurately. In addition, the present invention allows for a large number of channels to be accommodated.

Figure 4:
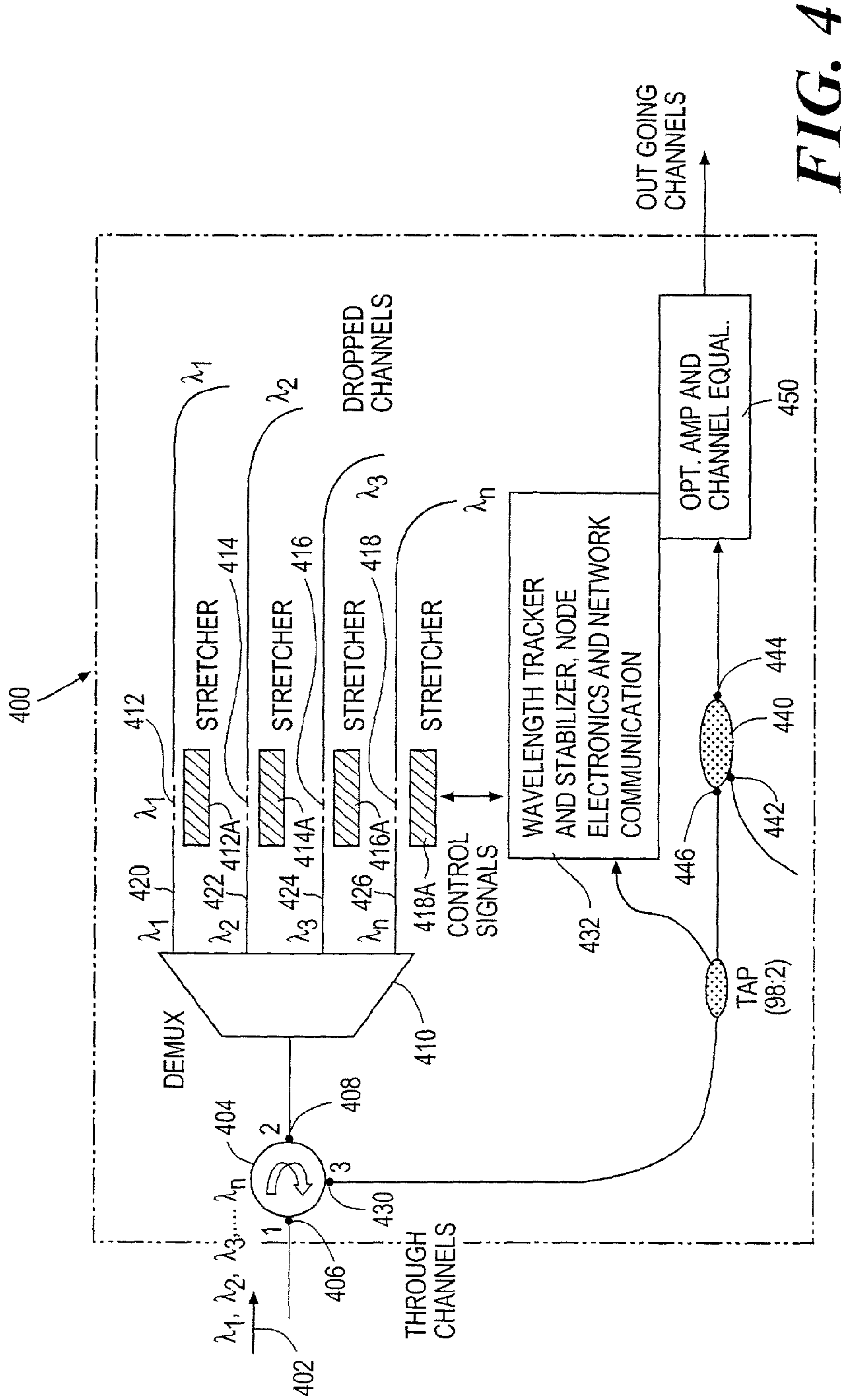
FIG. 4 is a schematic representation of an add-drop multiplexer according to a second embodiment of the present invention showing a parallel configuration of the in-fiber Bragg gratings.

FIG. 4 shows a schematic representation of an add-drop multiplexer 400 according to another embodiment of the present invention. The incoming signal 402, containing a plurality of wavelengths, enters optical circulator 404 at port 406 and exits through port 408 where it enters wavelength demultiplexer 410. The channel isolation and spacing of demultiplexer 410 determines the spectral quality of gratings 412, 414, 416 and 418. Wavelengths exiting demultiplexer 410 are routed through separate paths 420, 422, 424 and 426. Gratings 412, 414, 416, and 418 disposed, respectively, along paths 420, 422, 424, and 426 are attached on tuning elements 412A, 414A, 416A and 418A, such as but not limited to, piezoelectric actuators arranged to strain the gratings by varying amounts, or thermal heaters/coolers for controlling the reflecting band of the gratings. The reflection wavelength or Bragg resonance condition of each grating 412, 414, 416 and 418, is matched to that of wavelengths of incoming signal 402. Each wavelength is subsequently reflected off the corresponding grating and re-enters circulator 404 at port 408 and exits via port 430. These wavelengths are considered the 'through' channels. In other words, these wavelengths do not get dropped but are sent in the forward direction in the DWDM system.

The reconfigurable optical add-drop multiplexer (re-OADM) 400 also has wavelength tracker and stabilizer 432, which allows for precise wavelength monitoring and feedback to tuning elements 412A, 414A, 416A, and 418A. The tuning elements 412A, 414A, 416A, and 418A are kept well within the guard band of the channels. Wavelength tracker and stabilizer 432 controls the reflection wavelength of the gratings by providing appropriate feedback to tuning elements 412A, 414A, 416A, and 418A. Wavelength tracker and stabilizer 432 operates in the same manner as Wavelength tracker and stabilizer 240 described previously.

Similar to the previous embodiment, appropriate channels can be dropped by tuning the grating spectrum 'out of the way' of the incoming signals and let the signals drop on individual optical fibers 420, 422, 424, and 426.

Channels are added via port 442 of optical coupler 440 in this embodiment. The added wavelengths can be introduced using a tunable laser source or individual lasers, not shown on FIG. 4, operating at an appropriate wavelength and modulated with the signal information. The channels can be added, i.e. multiplexed, using a commercially available multiplexer or a set of couplers.

The output from port 444 of optical coupler 440 contains added channels as well as the through channels input to optical coupler 440 via port 446. The reconfigurable optical add-drop multiplexer (re-OADM) can be made "loss-less" by providing small amounts of built-in optical amplification. Fiber optical amplifiers 450 such as, but not limited to, an erbium fiber amplifier is suitable and currently available. Channel equalizing can provide high quality output signals thus making the re-OADM "transparent".

Figure 5:
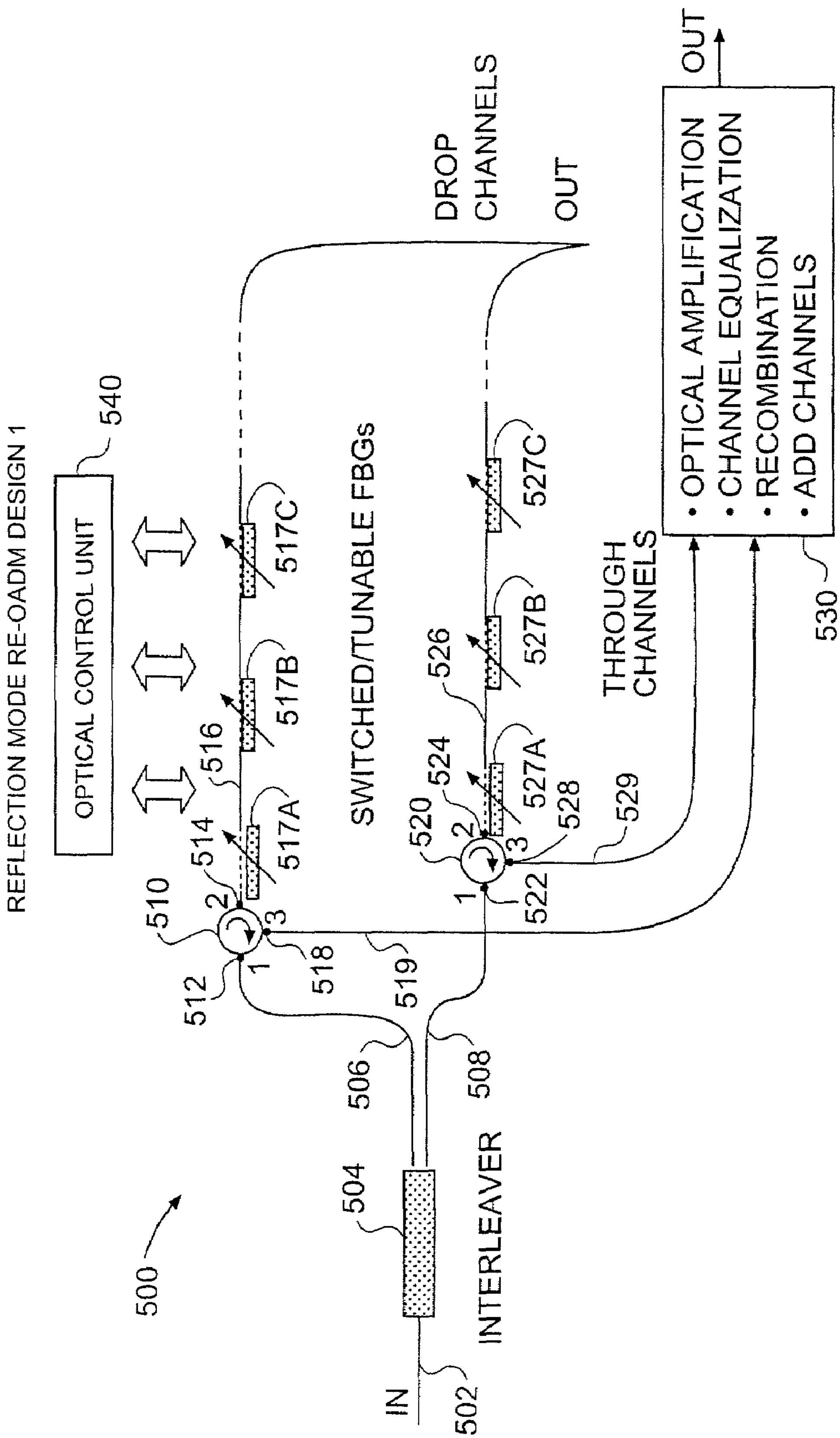
FIG. 5 is a schematic representation of an add-drop multiplexer according to another embodiment of the present invention.

FIG. 5 shows a schematic representation of an add-drop multiplexer 500 according to another embodiment of the present invention. The incoming signal 502, containing a plurality of wavelengths, enters interleaver 504 and exits interleaver 504 split into optical signal path 506 and optical signal path 508. Each optical signal enters a separate circulator. Optical signal path 506 enters first circulator 510 at port 512 and exits at port 514 to be directed into path 516. In path 516 are disposed a series of fiber-Bragg gratings 517A, 517B, 517C, etc. for selecting respectively wavelength $\lambda_{11}$, $\lambda_{12}$ and $\lambda_{13}$. While three Bragg gratings are shown in path 516, it is understood that there can be one grating, two or more gratings. Each fiber Bragg grating is configured to reflect a portion of optical wavelengths, included in the wavelength division multiplexed optical communication signal, to circulator port 514 while transmitting the remaining wavelengths, that is wavelengths other than $\lambda_{11}$, $\lambda_{12}$ and $\lambda_{13}$. The wavelengths being transmitted correspond to the optical channels to be dropped while the wavelengths reflected towards circulator port 514, to be output by circulator 510 through the optical port 518, correspond to the through channel.

Similarly, optical signal path 508 enters second circulator 520 at port 522 and exits at port 524 to be directed into path 526. In path 526 are disposed a series of fiber Bragg gratings 527A, 527B, 527C for selecting respectively wavelength $\lambda_{21}$, $\lambda_{22}$, $\lambda_{23}$. While three Bragg gratings are shown in path 526, it is understood that that there can also be one grating, two or more than three gratings. Each fiber Bragg grating is configured to reflect a portion of optical wavelengths included in the wavelength division multiplexed optical communication signal to circulator port 524 while transmitting the remaining wavelengths, that is wavelengths other than $\lambda_{21}$, $\lambda_{22}$, $\lambda_{23}$. The wavelengths being transmitted correspond to the optical channels to be dropped while the wavelengths reflected towards circulator port 524, to be output by circulator 520 through the optical port 528, correspond to the through channel.

Optical path 519, optically communicating with the third circulator port 518, is configured to receive optical wavelengths output by the third circulator port 518 corresponding to the channels not dropped from the wavelength division multiplexed optical communication signal in path 506. The channels in the optical path 519, consisting of $\lambda_{11}$, $\lambda_{12}$, and $\lambda_{13}$ correspond to the through channels.

Similarly, Optical path 529, optically communicating with the third circulator port 528, is configured to receive optical wavelengths output by the third circulator port 528 corresponding to the channels not dropped from the wavelength division multiplexed optical communication signal in path 508. The channels in the optical path 529, consisting of $\lambda_{21}$, $\lambda_{22}$, and $\lambda_{23}$ correspond to the through channels.

Optical path 519 connected to the third optical port of the first circulator 510 carrying wavelengths $\lambda_{11}$, $\lambda_{12}$, and $\lambda_{13}$ and optical path 529 connected to the third optical port of the second circulator 520 carrying wavelengths $\lambda_{21}$, $\lambda_{22}$, and $\lambda_{23}$ are connected to processing unit 530 comprising optical amplification, channel equalization, recombination and addition. Processing unit 530 amplifies, equalizes, combines and adjusts the two signals carried by the two paths 519 and 529.

In the same way presented in the first embodiment illustrated in FIG. 2, using optical channel control unit 540 allows for maintaining the fiber Bragg grating within the band guard for selecting the desired wavelengths. In other words, channel-monitoring unit 540, allows for precise wavelength monitoring and feedback to tuning elements as described previously.

This embodiment demonstrates the flexibility and scalability of the present reconfigurable add/drop multiplexer. Indeed, it is shown that two optical signals can be treated at the same time. However, it is understood that more than two optical signals can be treated in this way by splitting the incoming optical signal into more optical sub-signals and adding circulators and fiber Bragg grating lines to select wavelengths in each optical sub-signal.

Figure 6:
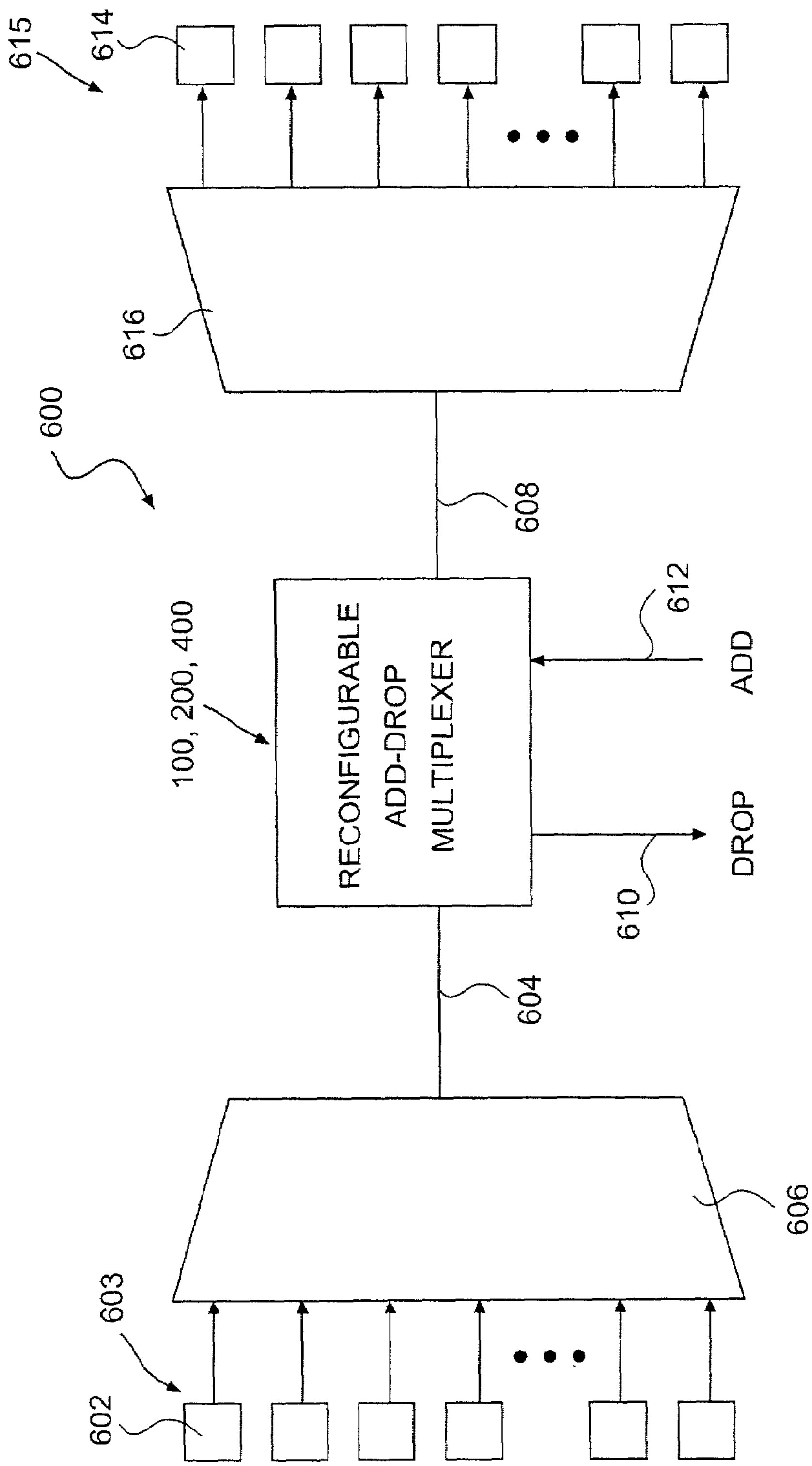
FIG. 6 is a block diagram representing general features of a wavelength division multiplexed system incorporating the reconfigurable add-drop multiplexer according to an embodiment of the present invention.

FIG. 6 shows generally an optical communication system 600 incorporating a reconfigurable add-drop multiplexer 100, 200, 400 according to the present invention. A transmitter 602, which may be understood alternately as a single transmitter such as transmitter 602, an array of transmitters or a tunable transmitting arrangement 603, produces an optical signal which is coupled into first optical transmission line 604. A multiplexer or combiner 606 may be used to couple signals from multiple transmitters 602 into a single optical transmission line 604. The optical signal includes at least one channel and will commonly include several channels. Reconfigurable add-drop multiplexer 100, 200 or 400 receives the optical signal transmitted through transmission line 604. Reconfigurable add-drop multiplexer 200 includes, as described previously, input port 204, circulator 202, optical filter 216, 218, 220 and 222, wavelength tracker and stabilizer 240, and optical coupler 226. Reconfigurable add-drop multiplexer 400 includes, as described previously, input port 406, circulator 404, optical filter 412, 414, 416 and 418, demultiplexer 410, wavelength tracker and stabilizer 432 and optical coupler 440.

Optical filter 216, 218, 220 and 222 is configured to reflect wavelength channels to be sent in second transmission line 608 corresponding to line 236 in FIG. 2 and configured to transmit wavelength channels to be dropped into third transmission line 610. Fourth transmission line 612 corresponding to line 234 in FIG. 2, is adapted to add wavelength channels to the through channels in second transmission line 608.

Similarly, optical filter 412, 414, 416 and 418 is configured to reflect wavelength channels to be sent in second transmission line 608 and configured to transmit wavelength channels to be dropped into third transmission line 610 which can be one or more than one optical line. Fourth transmission line 612 is adapted to add wavelength channels to the through channels in second transmission line 608.

A receiver 614 is also in optical communication with second transmission line 608 and receives the combined optical signal comprised of the through channels and the added channels. Receiver 614 may be understood as a single receiver 614 or as an array of receivers 615. A splitter, demultiplexer or channel selector 616 may be used to direct an optical channel into the receiver 614 from the transmission line 608.

A transmitter 602, which may be understood alternately as a single transmitter such as transmitter 602, an array of transmitters or a tunable transmitting arrangement 603, produces an optical signal which is coupled into first optical transmission line 604

Though the invention has been described in terms of multiple channels being transmitted along a single fiber, one skilled in the art will realize that it has application in systems in which only a single channel is transmitted on the fiber. Likewise, though the invention has been described in context of 1550 nm systems, it may be applied to 1310 nm systems, for example, or other systems operating at other wavelengths.

While the invention has been described in connection with particular embodiments, it is to be understood that the invention is not limited to the embodiments described, but on the contrary it is intended to cover all modifications and arrangements included within the spirit and scope of the invention as defined by the claims, which follow.

I claim:

1. An add-drop multiplexer, comprising:

an optical transmission signal input port adapted to receive a wavelength division multiplexed optical transmission signal;

an optical transmission signal output port adapted to output at least a portion of said wavelength division multiplexed optical transmission signal;

an add-drop optical channel port adapted to receive an optical add channel and output an optical drop channel;

a wavelength selective optical filter arranged between said optical transmission signal input port, said optical transmission signal output port and said optical add-drop channel port; and a wavelength tracker and stabilizer in optical communication with said wavelength selective optical filter, wherein said wavelength selective optical filter reflects an optical channel that will continue through said add-drop multiplexer along a transmission line to said optical transmission signal output port and permits an optical channel that is to be dropped to pass therethrough, and said wavelength tracker and stabilizer comprises an optical channel monitor having an absolute wavelength reference, said optical channel monitor providing absolute wavelength and intensity information of the optical channel reflected by said wavelength selective optical filter.

2. The add-drop multiplexer as recited in claim 1, further comprising an optical coupler in optical communication with said optical transmission signal input port and said wavelength selective optical filter.

3. The add-drop multiplexer as recited in claim 2, wherein said optical coupler is an optical circulator having a first optical port in communication with said optical transmission signal input port, a second optical port in communication with said wavelength selective optical filter, a third optical port in communication with said add-drop optical channel port.

4. The add-drop multiplexer as recited in claim 1, wherein said wavelength selective optical filter comprises an optical fiber having a fiber Bragg grating therein, said fiber Bragg grating having a reflecting band corresponding to an optical channel permitted to pass through said add-drop multiplexer.

5. The add-drop multiplexer as recited in claim 4, wherein said wavelength selective optical filter further comprises a tuning element disposed proximate to said fiber Bragg grating.

6. The add-drop multiplexer as recited in claim 5, wherein said tuning element comprises a mechanical strain element attached to said optical fiber that has said fiber Bragg grating.

7. The add-drop multiplexer as recited in claim 5, wherein said tuning element comprises a thermal element in thermal contact with said fiber Bragg grating.

8. The add-drop multiplexer as recited in claim 1, wherein said wavelength selective filter comprises an optical fiber having a plurality of fiber Bragg gratings therein arranged in series, at least one of the fiber Bragg gratings having a transmission characteristic different from a transmission characteristic of a second one of the fiber Bragg gratings.

9. The add-drop multiplexer as recited in claim 1, wherein said wavelength selective filter comprises a plurality of optical fibers, each comprising a fiber Bragg grating, and wherein said wavelength selective filter comprises an optical multiplexer in communication with said optical signal input port and said plurality of optical fibers, the plurality of optical fibers, each having a fiber Bragg grating, being arranged in parallel.

10. The add-drop multiplexer as recited in claim 1, further comprising an interleaver disposed between said optical transmission signal input port and said wavelength selective optical filter, said interleaver adapted to split an optical signal from said optical signal input port into a plurality of optical signals to be directed to said wavelength selective filter.

11. The add-drop multiplexer as recited in claim 1, further comprising an optical amplifier and channel equalizer in communication with said wavelength selective optical filter and said optical transmission signal output port.

12. A method of adding and/or dropping an optical channel in a wavelength division multiplexed system, comprising:

directing a wavelength division multiplexed optical signal to a wavelength selective filter, said wavelength selective filter having a higher reflectivity for a first optical channel of said wavelength division multiplexed optical signal compared to a second optical channel of said wavelength division multiplexed optical signal;

filtering said wavelength division multiplexed signal with said wavelength selective filter to produce a through channel substantially at a wavelength of said first optical channel and a drop channel substantially at a wavelength of said second optical channel;

directing said through channel into a transmission path of said wavelength division multiplexed system and allowing said drop channel to pass therethrough; and monitoring said through channel with a wavelength tracker and stabilizer comprising an absolute wavelength reference, wherein said through channel is reflected by said wavelength selective filter to continue along a wavelength division multiplexed transmission path of said wavelength division multiplexed system.

13. The method of adding and/or dropping an optical channel in a wavelength division multiplexed system as recited in claim 12, further comprising:

directing an add channel into said transmission path along with said through channel, wherein said add channel is at substantially a same wavelength as a wavelength of said drop channel.

14. The method of adding and/or dropping an optical channel in a wavelength division multiplexed system as recited in claim 12, wherein said filtering comprises selecting a wavelength with a wavelength selective filter comprising a fiber Bragg grating.

15. The method of adding and/or dropping an optical channel in a wavelength division multiplexed system as recited in claim 12, wherein said monitoring comprises determining absolute wavelength and intensity information of light reflected with said wavelength selective filter.

16. The method of adding and/or dropping an optical channel in a wavelength division multiplexed system as recited in claim 12, wherein said monitoring further comprises providing feedback to a tuning element disposed proximate said wavelength selective filter.

17. The method of adding and/or dropping an optical channel in a wavelength division multiplexed system as recited in claim 12, wherein said filtering reflects a plurality of optical channels to continue along a wavelength division multiplexed transmission path of said wavelength division multiplexed system.

18. The method of adding and/or dropping an optical channel in a wavelength division multiplexed system as recited in claim 17, further comprising equalizing a relative strength between at least two of said plurality of optical channels reflected in said filtering.

19. The method of adding and/or dropping an optical channel in a wavelength division multiplexed system as recited in claim 12, further comprising amplifying said through channel.

20. A dynamically reconfigurable add-drop multiplexer, comprising:

an optical signal input port;

a tunable band-reflecting optical filter in optical communication with said optical signal input port;

a wavelength tracker and stabilizer in optical communication with a reflected light path from said tunable band-reflecting optical filter, wherein said wavelength tracker and stabilizer comprises an optical channel monitor comprising an absolute wavelength and intensity reference, said wavelength tracker providing absolute wavelength and intensity information of light reflected by said tunable reflecting optical filter, and said band-reflecting optical filter reflects a wavelength channel to be sent as a through channel into said reflected light path and transmits a wavelength channel to be dropped.

21. The dynamically reconfigurable add-drop multiplexer as recited in claim 20, wherein said band-reflecting optical filter comprises a fiber Bragg grating.

22. The dynamically reconfigurable add-drop multiplexer as recited in claim 20, wherein said wavelength tracker and stabilizer comprises a mechanical strain varying assembly.

23. The dynamically reconfigurable add-drop multiplexer as recited in claim 20, wherein said wavelength tracker and stabilizer comprises a temperature varying assembly.

24. The dynamically reconfigurable add-drop multiplexer as recited in claim 20, further comprising:

an add channel input port in communication with said reflected light path from said tunable band-reflecting optical filter.

25. The dynamically reconfigurable add-drop multiplexer as recited in claim 20, further comprising:

an optical amplifier in communication with said output optical signal.

26. The dynamically reconfigurable add-drop multiplexer as recited in claim 25, further comprising:

a channel equalizer in communication with said output optical signal.

27. A wavelength division multiplexed optical communication system, comprising:

a plurality of transmitters;

an add-drop multiplexer in communication with said plurality of transmitters;

an optical transmission line in communication with said add-drop multiplexer;

an optical demultiplexer in communication with the optical transmission line; and a plurality of receivers in communication with the optical demultiplexer;

wherein said add-drop multiplexer comprises:

an optical transmission signal input port adapted to receive a wavelength division multiplexed optical transmission signal;

an optical transmission signal output port adapted to output at least a portion of said wavelength division multiplexed optical transmission signal;

an add-drop optical channel port adapted to receive an optical add channel and output an optical drop channel;

a wavelength selective optical filter arranged between said optical transmission signal input port, said optical transmission signal output port and said optical add-drop channel port; and a wavelength tracker and stabilizer in optical communication with said wavelength selective optical filter, wherein said wavelength selective optical filter reflects optical channels that will continue through said add-drop multiplexer along a transmission line to said optical transmission signal output port and permits an optical channel that is to be dropped to pass therethrough, and said wavelength tracker and stabilizer comprises an optical channel monitor comprising an absolute wavelength reference, said optical channel monitor providing absolute wavelength and intensity reference, said wavelength tracker providing absolute wavelength and intensity information of light reflected by said tunable reflecting optical filter.

28. The wavelength division multiplexed optical communication system as recited in claim 27, wherein said wavelength selective optical filter comprises an optical fiber having a fiber Bragg grating therein, said fiber Bragg grating having a reflecting band corresponding to an optical channel permitted to pass through said add-drop multiplexer.

29. The wavelength division multiplexed optical communication system as recited in claim 28, wherein said wavelength selective optical filter further comprises a tuning element disposed proximate to said fiber Bragg grating.

30. The wavelength division multiplexed optical communication system as recited in claim 29, wherein said tuning element comprises a mechanical strain varying assembly attached to said optical fiber that has said fiber Bragg grating.

31. The wavelength division multiplexed optical communication system as recited in claim 29, wherein said tuning element comprises a temperature varying assembly in thermal contact with said fiber Bragg grating.

32. The wavelength division multiplexed optical communication system as recited in claim 29, wherein said wavelength selective filter comprises an optical fiber having a plurality of fiber Bragg gratings therein arranged in series, at least one of the fiber Bragg gratings having a transmission characteristic different from a transmission characteristic of a second one of the fiber Bragg gratings.

33. The wavelength division multiplexed optical communication system as recited in claim 29, wherein said wavelength selective filter comprises a plurality of optical fibers, each comprising a fiber Bragg grating, and wherein said wavelength selective filter comprises an optical multiplexer in communication with said optical signal input port and said plurality of optical fibers, the plurality of optical fibers, each having a fiber Bragg grating, being arranged in a parallel.

34. The wavelength division multiplexed optical communication system as recited in claim 29, wherein said add-drop multiplexer further comprises an interleaver disposed between said optical transmission signal input port and said wavelength selective optical filter, said interleaver adapted to split an optical signal from said optical signal input port into a plurality of optical signals to be directed to said wavelength selective filter.

35. The wavelength division multiplexed optical communication system as recited in claim 29, wherein said add-drop multiplexer further comprises an optical amplifier and channel equalizer in communication with said wavelength selective optical filter and said optical transmission signal output port.

* * * * *